United States Patent
Hart et al.

(10) Patent No.: US 6,552,257 B1
(45) Date of Patent: Apr. 22, 2003

(54) NONROTATING PIVOTABLE SOLAR PANEL

(75) Inventors: Stephen P. Hart, Atlanta, GA (US); Donald John Stuart, Cumming, GA (US); Patrick Henry Ryan, Jr., Atlanta, GA (US)

(73) Assignee: American Signal Company, Atlanta, GA (US)

( * ) Notice: Subject to any disclaimer, the term of this patent is extended or adjusted under 35 U.S.C. 154(b) by 0 days.

(21) Appl. No.: 09/981,139

(22) Filed: Oct. 16, 2001

(51) Int. Cl.[7] .............................................. H01L 31/042
(52) U.S. Cl. .................... 136/246; 136/291; 250/203.4; 126/600
(58) Field of Search ................................. 136/246, 291; 250/203.4; 126/600

(56) References Cited

U.S. PATENT DOCUMENTS

| | | |
|---|---|---|
| 3,419,434 A | 12/1968 | Colehower |
| 4,077,144 A | 3/1978 | Smits |
| 4,091,799 A | 5/1978 | Steiner |
| 4,129,360 A | 12/1978 | Defiandre |
| 4,175,391 A * | 11/1979 | Baer ............................ 60/531 |
| 4,281,369 A | 7/1981 | Batte |
| 4,316,448 A | 2/1982 | Dodge |
| 4,421,943 A | 12/1983 | Withjack |
| 4,481,562 A | 11/1984 | Hickson |
| 4,486,820 A | 12/1984 | Baba et al. |
| 4,771,764 A | 9/1988 | Cluff |
| 4,933,020 A | 6/1990 | Wenzel |
| 4,968,355 A | 11/1990 | Johnson |
| 4,977,488 A | 12/1990 | Spotts et al. |
| 4,999,059 A | 3/1991 | Bagno |
| 5,022,929 A | 6/1991 | Gallois-Montbrun ........ 136/246 |
| 5,169,456 A | 12/1992 | Johnson |
| 5,217,296 A | 6/1993 | Tanner et al. |
| 5,228,924 A | 7/1993 | Barker et al. |
| 5,379,753 A | 1/1995 | Noeanich |
| 5,542,203 A | 8/1996 | Luoma et al. |
| 5,600,124 A | 2/1997 | Berger ...................... 250/203.4 |
| 5,630,660 A | 5/1997 | Chen |
| 5,632,823 A | 5/1997 | Sharan |
| 5,660,644 A | 8/1997 | Clemens |
| 5,730,117 A * | 3/1998 | Berger .......................... 126/604 |
| 5,850,579 A | 12/1998 | Melby et al. |
| 5,890,794 A | 4/1999 | Abtahi et al. |
| 6,058,930 A * | 5/2000 | Shingleton ................... 126/600 |
| 6,239,353 B1 * | 5/2001 | Hall et al. ................... 136/246 |
| 6,284,968 B1 * | 9/2001 | Niesyn ........................ 136/246 |
| 6,468,725 B2 * | 10/2002 | Shibata et al. .............. 136/246 |

FOREIGN PATENT DOCUMENTS

JP     2001-7374 A * 1/2001

OTHER PUBLICATIONS

ADDCO, Inc. website pages for S.T.A.R. system, copyright—2000.

* cited by examiner

*Primary Examiner*—Alan Diamond
(74) *Attorney, Agent, or Firm*—Jason A. Bernstein; Bernstein & Associates, P.C.

(57) ABSTRACT

An apparatus for enabling a solar panel to track a solar or other energy source, comprising a panel; a mast; a first collar slidingly receiving the mast; a sleeve slidingly receiving the mast and the link tube; a controller second collar slidingly receiving the mast; a universal joint comprising a first section and a second section, both sections pivotably joined, the first section fixedly attached to one end of the mast; a first arm fixedly attached to the controller second collar; a second arm fixed attached to the first collar; a link pivotably joining the first arm and the second arm; a first stop associated with the first collar; wherein the mast is capable of vertical movement within the first collar such that the panel can tilt and be displaced angularly.

5 Claims, 4 Drawing Sheets

NONROTATING PIVOTABLE SOLAR PANEL

FIELD OF THE INVENTION

The present invention relates generally to solar panels with adjustable supports, and more particularly, to solar panels for electrically powering devices such as portable signage and having adjustable mounting supports for optimally orienting the solar panel relative to the sun.

BACKGROUND OF THE INVENTION

Portable signs are used in a variety of applications such as roadside traffic control and message signs and commercial advertising. Such roadside traffic signs are commonly used to identify and designate vehicle lanes and entry and exit ramps, to provide other traffic control information, and to alert drivers of traffic conditions, construction sites, and other important road conditions.

Roadside signs are commonly mounted on a trailer frame that allows the sign to be towed by a vehicle to different locations. To provide sufficient sign illumination at night and during low sunlight daytime periods, portable roadside signs commonly have a portable rechargeable battery and a generator or a solar panel for recharging the battery during daylight. The solar panels typically comprise an array of operatively connected photovoltaic cells that produce a voltage and transmit an electrical current to the battery and/or sign for operation thereof.

In order for the solar panel to receive as much solar energy as possible for conversion into electricity, it is desirable to mount the solar panel on an adjustable support apparatus that allows for variably orienting the solar panel relative to the general position of the sun. For example, when a portable sign is moved to a new location in the Northern hemisphere, the solar panel should be adjusted to face a Southerly direction while allowing the sign to face the desired target audience.

BRIEF DESCRIPTION OF THE PRIOR ART

There are known in the art a number of solar panels and mounting assemblies for a variety of applications that provide for orienting the solar panel toward the sun. For the purpose of clarity herein, "tilting" is defined as pivotal movement about a horizontal axis thereby forming a declination angle, and "rotating" is defined as rotational movement about a vertical axis thereby forming an azimuthal angle.

U.S. Pat. No. 4,421,943 to Withjack discloses a collapsible mobile solar energy power source comprising solar panels mounted on a towable trailer. Each solar panel is pivotally attached at its bottom edge to a main base, and a variable support leg assembly is provided for tilting the solar panel to a storage position inside the base. The Withjack device is thus capable of tilting, but not rotating, to track the sun.

U.S. Pat. No. 5,228,924 to Barker et al. discloses a photovoltaic panel support assembly comprising photovoltaic panels supported for pivotal movement on a horizontal axis, with a motor drive and telescoping tubes for extending to pivot the panel. The Barker et al. device is thus capable of tilting, but not rotating, to track the sun.

U.S. Pat. No. 5,379,753 to Noennich discloses a solar panel control apparatus comprising a solar panel with weights on one end for tilting that end downward. A crank mechanism is connected to the center of the solar panel for raising or lowering the panel. The Noennich device is thus capable of tilting, but not rotating, to track the sun.

U.S. Pat. No. 4,129,360 to Deflandre et al. discloses heliostats comprising a mirrored panel for reflecting solar energy onto a solar panel. Three tubes are arranged in a triangular configuration forming a base, with the panel bottom edge pivotally attached to base and a variable length bar attached to the base and the panel top edge for tilting the mirror panel. A curved track is provided for rotating the mirror panel. The Deflandre et al. device thus provides for tilting and rotating the mirror panel to orient the mirror panel towards the sun.

U.S. Pat. No. 4,771,764 to Cluff discloses solar collectors on a raft floating in water. The bottom of each solar collector is hingedly mounted to the raft and the top of each is pivotally connected to a push-pull rod for tilting to provide for tracking of the sun. A roller engages and rotationally drives a side of the raft as it floats in the water. The Cluff device thus provides for tilting and rotating the solar collectors to orient them towards the sun.

U.S. Pat. No. 5,022,929 to Gallois-Montbrun discloses a solar collector comprising a plurality of solar panels each having a front and rear panel hingedly connected together. Each rear panel is tiltable relative to the corresponding front panel by a hydraulic jack attached to two links attached to the panel. The solar collector is mounted on a rotatable plate. The Gallois-Montbrun device thus provides for tilting and rotating the solar collector to orient it towards the sun.

U.S. Pat. No. 5,542,203 to Lumoa et al. discloses a mobile sign mounted on a trailer frame. A solar panel is mounted to the sign by a mast having a stationary lower portion mounted to the trailer frame and a telescopically extendable upper portion connected to the solar panel. Pivotal linkages are attached to the mast and the solar panel for tilting the panel. The mast is rotatable for rotating the solar panel. The Lumoa et al. device thus provides for tilting and rotating t he solar collector to orient it towards the sun.

Each of these prior art devices generally provides for tilting and rotation of the panel. Titling of the panel is generally provided by a pivotal connection at the bottom of the panel and a drive mechanism of some sort, with the panel bottom either directly hinged to a base of some sort or hingedly connected to a rigid non-extendable linkage. Several of these devices also provide for rotation of the panel, however, such rotation is independently provided by separately rotating the support apparatus (such as a pole or plate) for the entire panel, thereby requiring an additional drive mechanism to accomplish rotation in addition to tilting.

U.S. Pat. No. 5,600,124 to Berger discloses a solar panel mounted on a pole, with two cross-bars pivotally attached to the pole and the solar panel for tilting the solar panel, and two or four cylinders are connected to the pole for tilting or rotating the panel. To provide for additional rotation of the solar panel, the pole is rotary. The Berger device thus provides for tilting and rotating the solar collector to orient it towards the sun.

In order for the cylinders to provide the rotation function, however, the device provides complex diversion valving operable in conjunction with a radial catch that is believed to allow the solar panel only one axis of turning at a time and a limited rotational turning angle, and that makes the device generally more costly and less reliable. Thus, while Berger provides for rotation of the solar panel by means in addition to rotating the support pole, the mechanisms for accomplishing such rotational have not proven entirely satisfactory.

Accordingly, what is needed but not found in the prior art is an adjustable solar panel which can be used for electrically powering devices such as portable signage, and that has adjustable mounting supports for optimally orienting the solar panel at any angle relative to the sun by simple, reliable, cost-effective means.

SUMMARY OF THE INVENTION

The present invention provides an apparatus for enabling a solar panel to track a solar or other energy source, comprising a panel; a mast; a first collar slidingly receiving the mast; a sleeve slidingly receiving the mast and the link tube; a controller second collar slidingly receiving the mast; a universal joint comprising a first section and a second section, both sections pivotably joined, the first section fixedly attached to one end of the mast; a first arm fixedly attached to the controller second collar; a second arm fixed attached to the first collar; a link pivotably joining the first arm and the second arm; a first stop associated with the first collar; wherein the mast is capable of vertical movement within the first collar such that the panel can tilt and be displaced angularly.

BRIEF DESCRIPTION OF THE DRAWINGS

The various features and advantages of the invention will be apparent from the attached drawings, in which like reference characters designate the same or similar parts throughout the figures, and in which.

DESCRIPTION OF THE PREFERRED EMBODIMENTS

The present invention provides an apparatus for raising, lowering, tilting and pivoting an object. The object can be any object capable of being mounted on a rod. Preferably, the object is a conventional solar panel, but, can alternatively be a mirror or other light reflecting surface, artwork, energy transmitter and/or receiver, sound transmission device, light transmission device (e.g., a single or array of lamps or lasers), heat reflector or transmitter, and the like. For the purposes of the present disclosure, a solar panel will be discussed as a preferred example.

In a preferred embodiment, shown in FIGS. 1–4, the present invention provides an adjustable solar panel assembly 10 which can be attached to a mobile sign transport assembly 12 as is known in the art.

Figure 1:
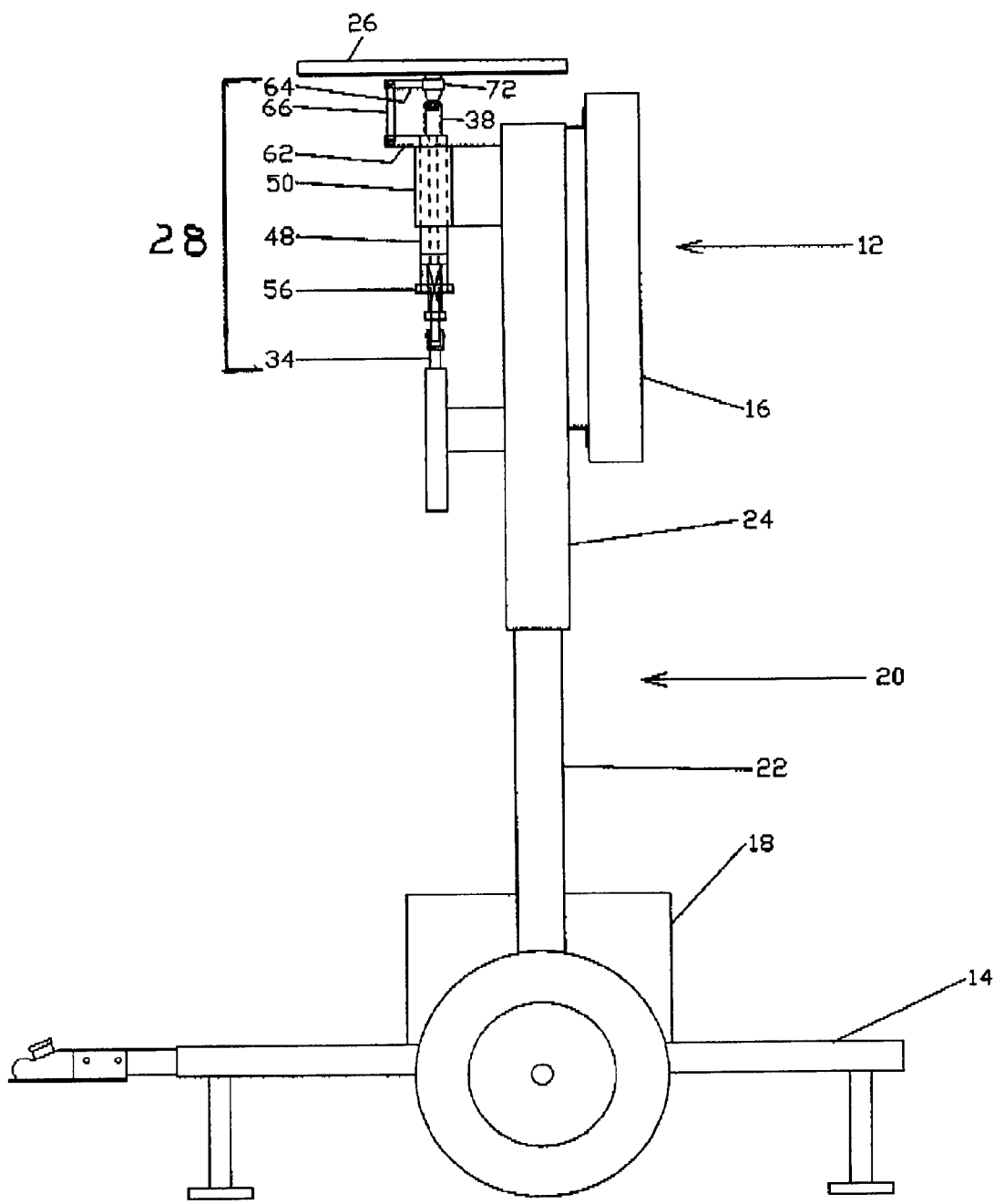
FIG. 1 is a side schematic view of a mobile sign transport assembly.

FIG. 1 shows a mobile sign transport assembly 12, which may comprise a wheeled frame 14, a sign panel 16 mounted to the wheeled frame 14, and a chargeable battery 18 mounted to the frame 14 or the sign panel 16 and electrically connected to the sign panel 16. The sign panel 16 may have electrically powered features such as illumination, power management controls, adjustable supports for a solar panel, and the like. Also, the mobile sign transport assembly 12 may be mounted to the frame 14 by a sign mast 20 having a first telescopic sign mast member 22 and a second telescopic sign mast member 24 for raising and lowering the sign panel 16.

The adjustable solar panel assembly 10 comprises a solar panel 26 and an adjustable support assembly 28. The solar panel 26 is of a conventional type known by those skilled in the art. The solar panel 26 is electrically connected to the battery and/or to the sign panel 16 to permit converting solar energy into electricity for charging the battery and powering the sign panel 16. It will be understood by those skilled in the art that mirrors, lenses, sun shades, and other structures may be advantageously utilized in conjunction with the support apparatus 28.

Figure 2:
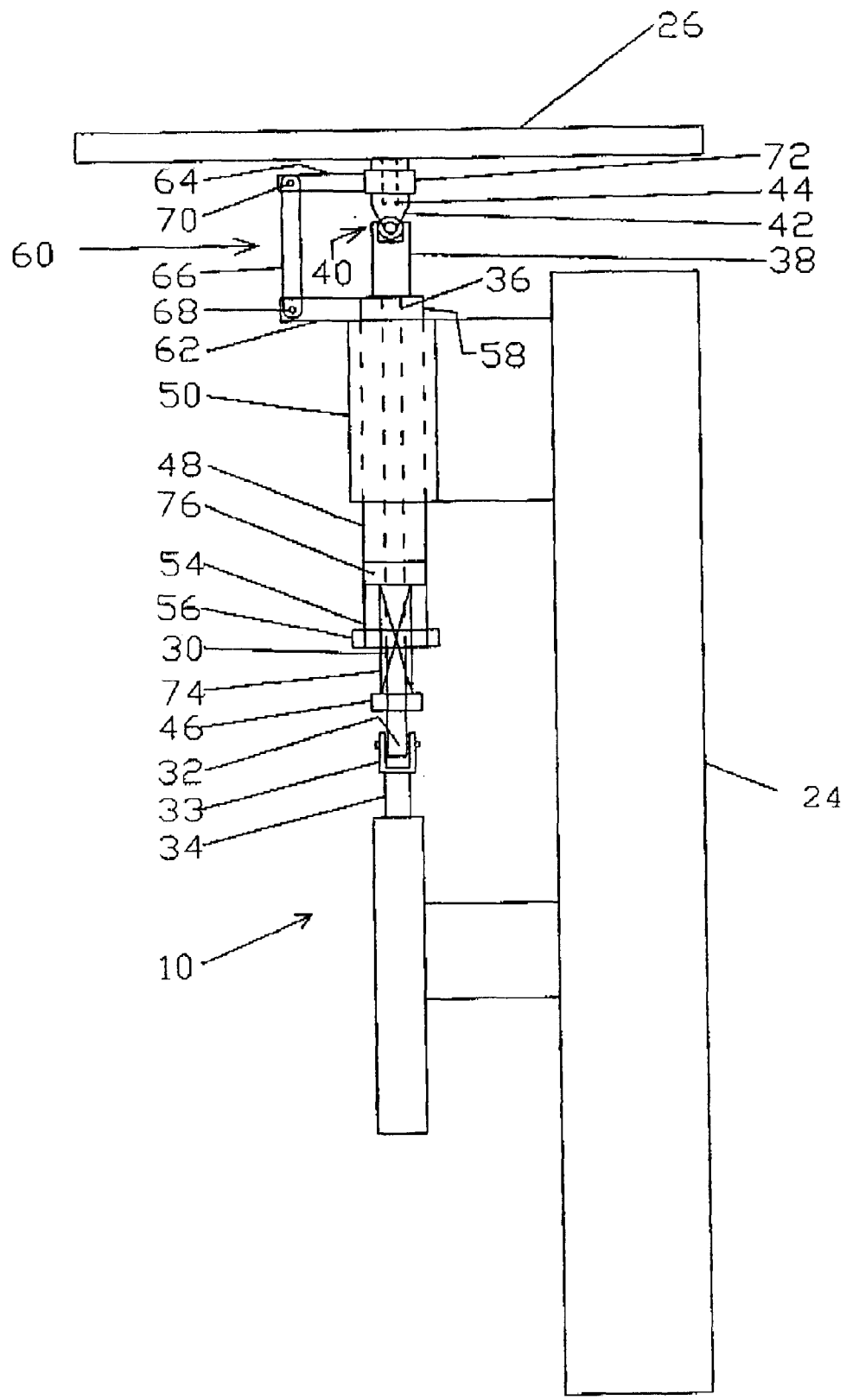
FIG. 2 is a side schematic view of a preferred embodiment of the present invention showing the mast in a lowered position and the panel horizontal.

FIG. 2 shows the adjustable solar panel assembly 10 comprising a mast 30 connected at a lower first end 32 to the upper half of a universal joint coupling 33. The lower half of the coupling 33 is coupled to a lifting mechanism 34. The upper second end 36 of the mast 30 is coupled to the lower half 38 of a universal joint 40. The upper half 42 of the universal joint 40 is attached to a rod 44 (shown in phantom). The rod 44 is attached to the underside of the solar panel 26. Preferably, the mast 30 has a stop collar 46. Preferably, the stop collar 46 is adjustable to control the extent of extension of the mast 30.

The mast 30 is slidingly received within a link tube 48. The link tube 48 is slidingly received within a sleeve 50, which in turn is preferably fixedly attached to the support member 24. The lower end 54 of the link tube 48 has a stop 56 associated therewith. The stop 56 prevents over extension of the link tube 48 within the sleeve 50.

A linkage assembly 60 comprises a lower arm 62, an upper arm 64 and a linkage arm 66, whereby the lower arm is pivotably associated with the linkage arm 66 by a pin 68 and the upper arm is pivotably associated with the linkage arm by a pin 70. The upper end 58 of the link tube 48 is fixedly associated with the lower arm 62. The upper arm 64 is fixedly associated with a controller collar 72, which in turn slidingly receives the mast 30. The upper end of the controller collar 72 preferably abuts the underside of the solar panel 26 (or proximate thereto) and the lower end of the collar 72 preferably abuts the upper half 42 of the universal joint 40. The lower arm 62 is fastened to the link tube 48 and turning the link tube 48 causes the angular displacement of the top half of the universal joint and tip the solar panel to the desired location. The lower arm 62 can also be attached to a collar 72 around the top of the link tube 48 and be free to rotate in relation to the link tube 48. The rotation of this collar 72 will then be the item controlling the angular motion of the universal joint 40 and the attached solar panel 26. A spring 74 is optionally added within the mast 30 to control when tipping occurs. The lower end of the spring abuts the collar stop 46 and the upper end of the spring abuts a spring stop 76.

OPERATION

Figure 3:
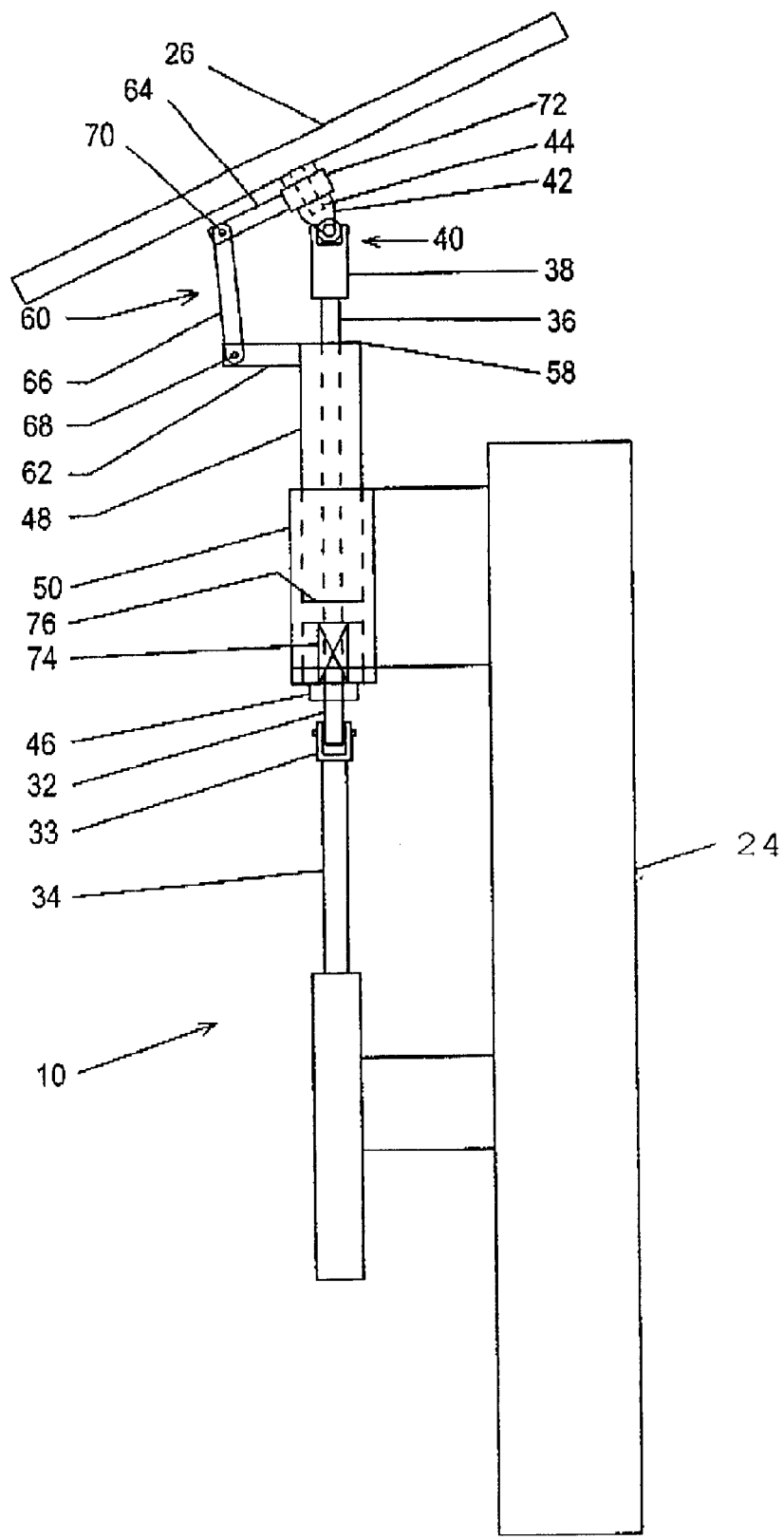
FIG. 3 is a side schematic view showing the mast in a raised position and the solar panel tilted to the left.
Figure 4:
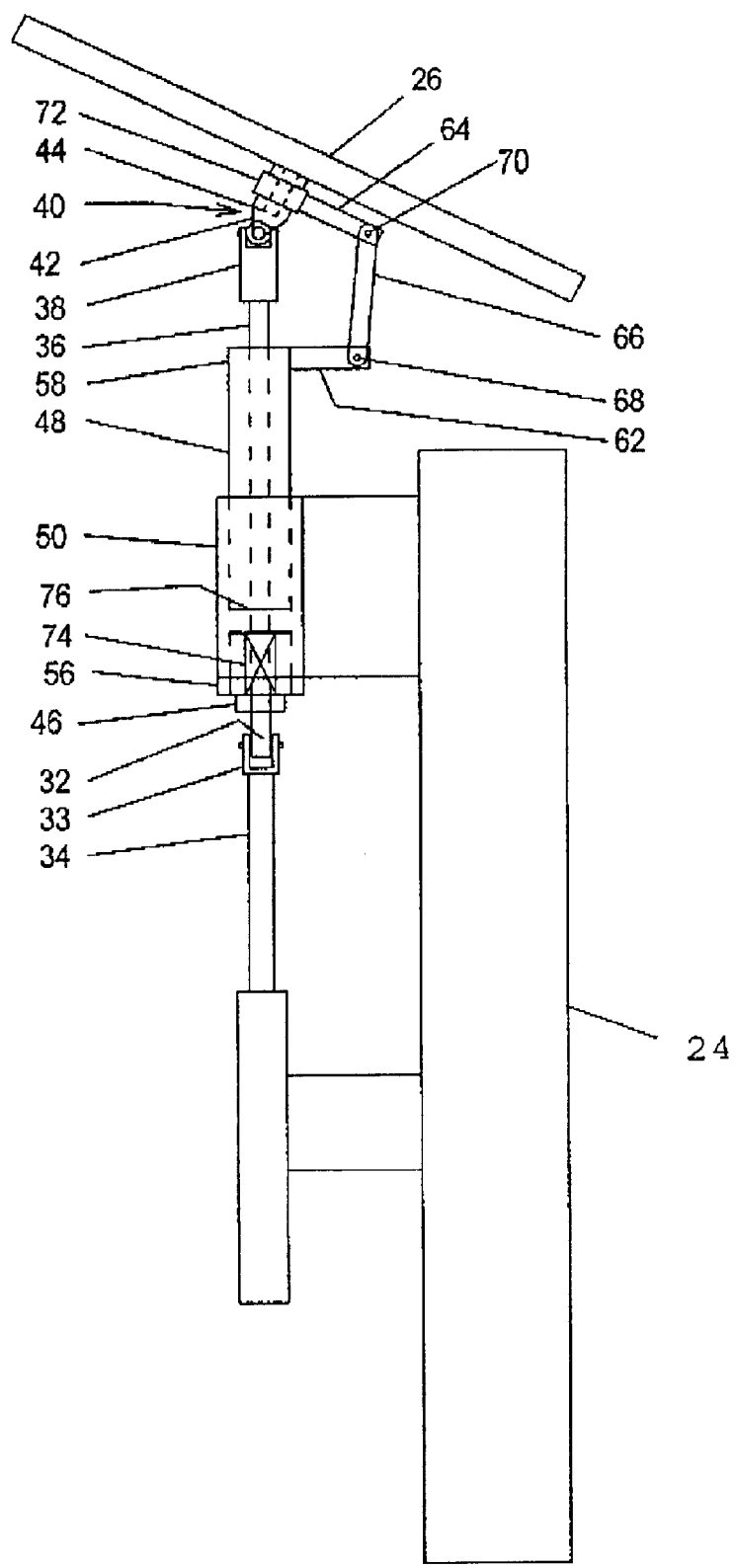
FIG. 4 shows a side schematic view showing the mast in a raised position and the panel tilted to the right.

In operation, the mast 30 can be raised and lowered by the lifting mechanism 34. When raised, the mast 30 can rise until the stop collar 46 abuts the stop 56. The stop collar 46 can be adjustable, such as by being internally threaded and then threaded on external threads on at least a portion of the mast 30 to a desired position thereon. Alternatively, other stops can be used, such as a deformable or rigid ring on the mast 30. The more the mast 30 is raised, the greater the tilt angle of the panel 26 increases as the universal joint 40 halves 38 and 42 decrease their relative angle (from 180 degrees). Thus, the degree of panel 26 tilt is determined by the height of the mast 30. The link tube 48 can be turned manually, such as by orienting it with a handle (not shown) as is known in the art to point at the optimal position with respect to the sun. Alternatively, turning can be achieved mechanically. In a mechanical turning embodiment, a keyed collar 72 on the link tube 48 or a spline collar (not shown) both as are known to those of ordinary skill in the art, can be used as a method for driving the link tube 48. The actual driving force (not shown) can be rotary through gears, a worm wheel or linear through a linkage. FIG. 3 shows the adjustable solar panel assembly 10 with the mast 30 raised and the panel 26 tilted. The lower arm 62 is rigid in relation to the link tube 48 and turning the link tube 48 will cause the angular displacement of the top half of the universal joint 40 and tip the solar panel 26 to the desired direction. The lower arm 62 can also be attached to a collar 72 around the top of the link tube 48 and be free to rotate in relation to the link tube. The rotation of this collar will then be the item controlling the angular motion of the universal joint and the attached solar panel.

As the lift mechanism is extended the link tube 48 raises until the stop 56 comes in contact with the bottom of the sleeve 50. Up to this point a spring load has prevented the universal joint 40 from moving relative to the link tube 48. Further motion of the lift mechanism 34 starts to compress the spring 74 and forces the universal joint 40 to rise in relation to the link tube 48. The collar 72 and upper arm 64 and upper half 42 of the universal joint 40 are forced to tilt since the linkage arm 66 and the lower arm 62 restrain them. Rotating the link tube 48 drives the linkage assembly 60 around and causes the top half 42 of the universal joint 40 to point in a different direction.

An important aspect of the present invention is that the mast 30 does not rotate. This in turn shows an important aspect of the invention, namely, that the panel 26 does not rotate to any appreciable degree. As the link tube 48 rotates about the mast 30, the arm assembly 60 and the controller collar 72 turns around the rod 44. Note that the rod 44 itself does not turn. As the link tube 48 and linkage assembly 60 turns the panel 26 changes tilt angle, as shown in FIG. 3. Note that the panel 26 maintains its relative rotational position and does not rotate about the axis of the mast 30.

While the invention has been described in connection with certain preferred embodiments, it is not intended to limit the scope of the invention to the particular forms set forth, but, on the contrary, it is intended to cover such alternatives, modifications, and equivalents as may be included within the true spirit and scope of the invention as defined by the appended claims. All patents, applications and publications referred to herein are hereby incorporated by reference in their entirety.

What is claimed is:

1. An apparatus for enabling a solar panel to track a solar or other energy source, comprising:
   a) a panel;
   b) a mast operatively connected to said panel;
   c) a first collar slidingly receiving said mast;
   d) a sleeve slidingly receiving said mast;
   e) a link tube for turning said mast, said link tube being slidingly received within said sleeve;
   f) a controller second collar slidingly receiving said mast;
   g) a universal joint comprising a first section and a second section, both sections pivotably joined, said first section fixedly attached to one end of said mast and said second section coupled to said panel;
   h) a first arm fixedly attached to said controller second collar;
   i) a second arm fixedly attached to said first collar;
   j) a link pivotably joining said first arm and said second arm; and,
   k) a first stop associated with said first collar,
   wherein said mast is capable of vertical movement within said first collar such that said panel can tilt and be displaced angularly.

2. The apparatus of claim 1, further comprising a second stop associated with said mast, said second stop being vertically adjustable.

3. The apparatus of claim 1, wherein said sleeve is fixedly associated with a support member.

4. The apparatus of claim 3, further comprising lift means associated with said mast for raising and lowering said mast, said lift means being fixedly associated with said support member.

5. The apparatus of claim 1, further comprising
   a spring disposed coaxial with said mast, and
   a second stop disposed within said first collar, said spring disposed between said first and said second stops.

* * * * *